United States Patent
Jang

(10) Patent No.: US 11,228,803 B1
(45) Date of Patent: Jan. 18, 2022

(54) METHOD AND APPARATUS FOR PROVIDING OF SECTION DIVIDED HETEROGENEOUS IMAGE RECOGNITION SERVICE IN A SINGLE IMAGE RECOGNITION SERVICE OPERATING ENVIRONMENT

(71) Applicant: INNOPIA TECHNOLOGIES, INC., Gyeonggi-do (KR)

(72) Inventor: Dong-yoon Jang, Gyeonggi-do (KR)

(73) Assignee: INNOPIA TECHNOLOGIES, INC., Gyeonggi-Do (KR)

( * ) Notice: Subject to any disclaimer, the term of this patent is extended or adjusted under 35 U.S.C. 154(b) by 0 days.

(21) Appl. No.: 17/364,592

(22) Filed: Jun. 30, 2021

(30) Foreign Application Priority Data

Sep. 24, 2020 (KR) .......................... 10-2020-0123667

(51) Int. Cl.
  *H04N 21/44* (2011.01)
  *H04N 21/4223* (2011.01)
  *H04N 21/442* (2011.01)

(52) U.S. Cl.
  CPC ... *H04N 21/44008* (2013.01); *H04N 21/4223* (2013.01); *H04N 21/44218* (2013.01)

(58) Field of Classification Search
  CPC ......... H04N 21/44008; H04N 21/4223; H04N 21/44218; H04N 21/21805;
  (Continued)

(56) References Cited

U.S. PATENT DOCUMENTS 8,577,092 B2 * 11/2013 Kim .................... G06K 9/00221
  382/115
2005/0132420 A1 * 6/2005 Howard .................. G10L 15/24
  725/135

(Continued)

FOREIGN PATENT DOCUMENTS

JP         2018181081 A  * 11/2018
KR   1020140056321 A      5/2014

(Continued)

OTHER PUBLICATIONS

Z. Chen, S. Lowry, A. Jacobson, Z. Ge and M. Milford, "Distance metric learning for feature-agnostic place recognition," 2015 IEEE/RSJ International Conference on Intelligent Robots and Systems (IROS), 2015, pp. 2556-2563, doi: 10.1109/IROS.2015.7353725. (Year: 2015).*

(Continued)

*Primary Examiner* — Cynthia M Fogg
(74) *Attorney, Agent, or Firm* — Christensen O'Connor Johnson Kindness PLLC

(57) ABSTRACT

Provided is a method and apparatus for providing a section divided heterogeneous image recognition service in a single image recognition service operating environment. An apparatus for providing a section divided heterogeneous image recognition service in a single image recognition service operating environment includes a model executor configured to switch a single model of a first image recognition model and a second image recognition model to provide a heterogeneous image recognition service in a single image recognition service operating environment and to synchronize the switched model with the analyzer; the analyzer configured to extract and identify a target from an image acquired according to a model synchronized with the model executor and to transmit related content-related information to a related content storage and a transmitter based on (Continued)

extraction and identification results; a camera processing configured to preprocess an image acquired through the camera and to transmit the preprocessed image to the analyzer; and a controller configured to control the model executor, the analyzer, the camera processing, and the remote image transceiver based on service requirements input from a user.

7 Claims, 3 Drawing Sheets

(58) Field of Classification Search
 CPC ......... H04N 21/23418; H04N 21/2662; H04N 5/23229; H04N 21/812; H04N 21/4722; H04N 21/8126; H04N 21/4316; H04N 21/4122; H04N 21/478; H04N 21/4415; H04N 21/44213
 USPC .......................................................... 725/12
 See application file for complete search history.

(56) References Cited

U.S. PATENT DOCUMENTS

| | | | | |
|---|---|---|---|---|
| 2007/0201824 | A1* | 8/2007 | Masaki | H04N 21/4383 386/230 |
| 2011/0142233 | A1* | 6/2011 | Kim | H04N 7/181 380/200 |
| 2012/0119987 | A1* | 5/2012 | Im | G06F 3/0304 345/156 |
| 2012/0124525 | A1* | 5/2012 | Kang | G06F 3/0482 715/863 |
| 2013/0347018 | A1* | 12/2013 | Limp | H04N 21/4394 725/19 |
| 2014/0245335 | A1* | 8/2014 | Holden | H04N 21/4223 725/12 |

FOREIGN PATENT DOCUMENTS

| | | |
|---|---|---|
| KR | 1020160027576 A | 3/2016 |
| KR | 10-1690876 B1 | 12/2016 |
| KR | 1020180000566 A | 1/2018 |
| KR | 10-2018-0121273 A | 11/2018 |
| KR | 20200058260 A * | 5/2020 |

OTHER PUBLICATIONS

C. Oh and K. Han, "Design and implementation of a targeted advertising system based on an audience recognition scheme for Smart TV," 2015 IEEE Seventh International Conference on Intelligent Computing and Information Systems (ICICIS), 2015, pp. 293-299, doi: 10.1109/IntelCIS.2015.7397236. (Year: 2015).*

* cited by examiner

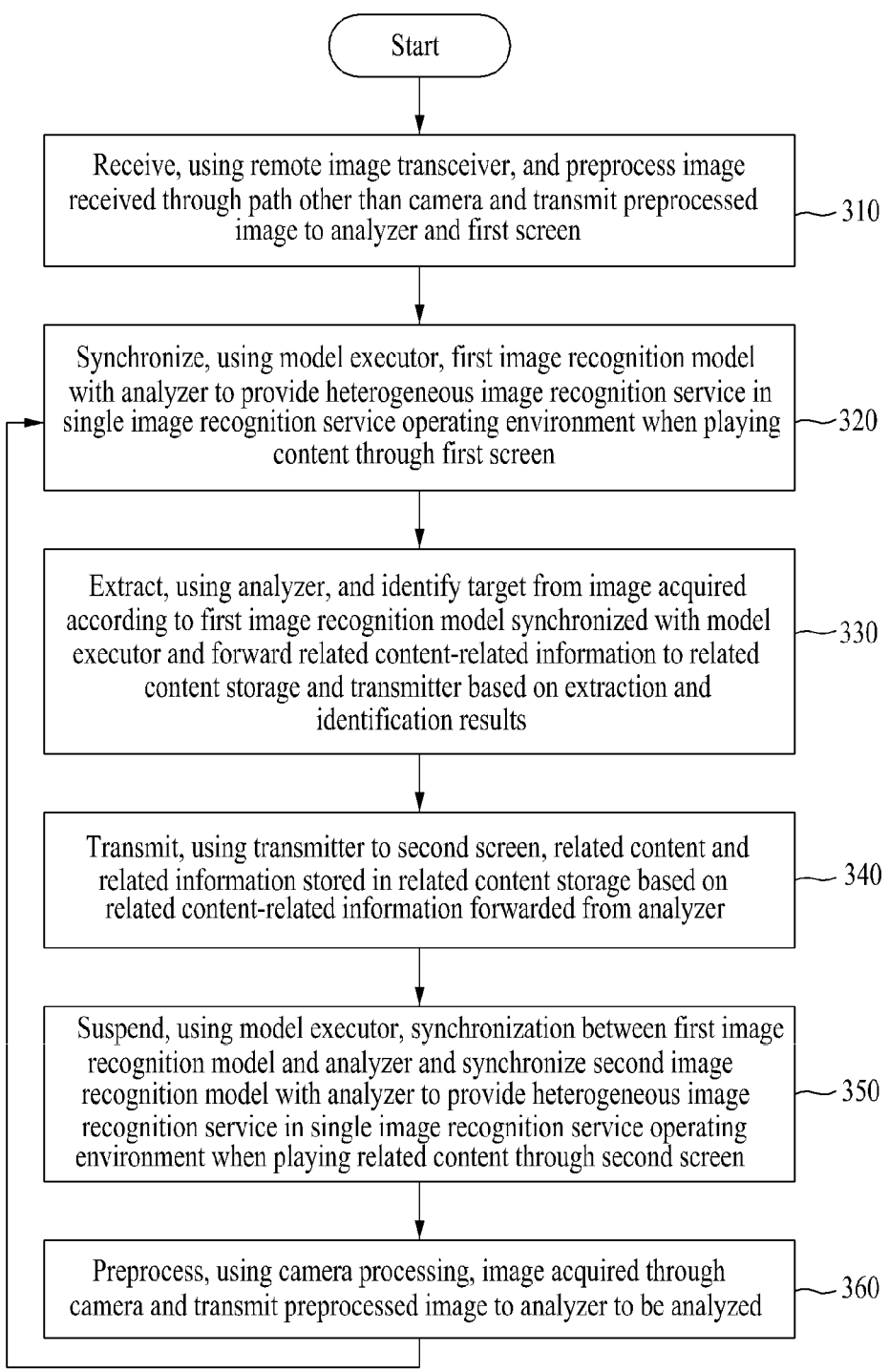

METHOD AND APPARATUS FOR PROVIDING OF SECTION DIVIDED HETEROGENEOUS IMAGE RECOGNITION SERVICE IN A SINGLE IMAGE RECOGNITION SERVICE OPERATING ENVIRONMENT

CROSS-REFERENCE TO RELATED APPLICATION

This application claims the priority benefit of Korean Patent Application No. 10-2020-0123667, filed on Sep. 24, 2020, in the Korean Intellectual Property Office, the disclosure of which is incorporated herein by reference.

BACKGROUND

1. Field of the Invention

The following description of example embodiments relates to a method and apparatus for providing a section divided heterogeneous image recognition service in a single image recognition service operating environment.

2. Description of the Related Art

With development of technology and change in demand of viewers, a broadcasting environment is changing. Conventional analog broadcasting is being converted to digital broadcasting. Diversification of broadcasting media is ongoing from terrestrial broadcasting to cable broadcasting, satellite broadcasting, and so-called an Internet protocol television (IPTV) service and terrestrial and satellite digital multimedia broadcasting (DMB) services that are multimedia providing schemes using high-speed communication networks.

Digital broadcasting may increase its capacity four to eight times compared to a conventional analog broadcasting scheme and may provide additional services in various fields, such as, for example, sports, movie, home shopping, and music. Also, as various broadcasting types, such as cable broadcasting, satellite broadcasting, DMB, IPTV, and the like, are provided, viewers have a wide range of choices.

A service platform that provides artificial intelligence (AI)-based image recognition according to the related art, such as, for example, Korean Patent Laid-Open Publication No. 10-2016-0141396, published on Dec. 9, 2016, may simultaneously process two or more types of different image recognition functions in each processor in a multi-processor operable environment, such as a server. However, in a multi-processor inoperable environment, only one type of image recognition function may be provided at a time. For example, a device equipped with a single processor may identify a person by applying an A image recognition model to an image collected by a camera and may identify an object by applying a B image recognition model to an image collected at a remote location.

Accordingly, there is a need for a method that may provide a service by simultaneously using heterogeneous image recognition types in a single image recognition service operating environment

SUMMARY

Example embodiments provide a method and apparatus for switching and simultaneously providing heterogeneous image recognition types through service recognition in a single image recognition service operating environment in which only a single image recognition service is provided at a time, and simultaneously provide heterogeneous image recognition service types to a user by alternately switching between heterogeneous image recognition types according to characteristic, purpose, and time information of heterogeneous image recognition service types.

According to an aspect, there is provided an apparatus for providing a section divided heterogeneous image recognition service, the apparatus including a remote image transceiver configured to receive and preprocess an image received through a path other than a camera and to transmit the preprocessed image to an analyzer and a first screen; a model executor configured to switch a single model of a first image recognition model and a second image recognition model and to synchronize the switched model with the analyzer to provide a heterogeneous image recognition service in a single image recognition service operating environment, the model executor configured to synchronize the first image recognition model with the analyzer when playing content through the first screen and to suspend synchronization between the first image recognition model and the analyzer and to synchronize the second image recognition model with the analyzer when playing related content through a second screen; the analyzer configured to extract and identify a target from an image acquired according to a model that is synchronized with the model executor and to forward related content-related information to a related content storage and a transmitter based on extraction and identification results; the transmitter configured to transmit, to the second screen, related content and related information stored in the related content storage based on the related content-related information forwarded from the analyzer; a camera processing configured to preprocess an image acquired through the camera and to transmit the preprocessed image to the analyzer; a controller configured to control the model executor, the analyzer, the camera processing, and the remote image transceiver based on service requirements input from a user; and the related content storage configured to store related content and related information to be transmitted based on analysis results of the analyzer and to forward the related content and the related information to the transmitter in response to an external request.

The model executor may be configured to switch to a content object recognition mode and to synchronize a content object recognition model with the analyzer to provide the heterogeneous image recognition service in the single image recognition service operating environment when playing the content through the first screen, such that the analyzer extracts and identifies a target from an image being played using the synchronized content object recognition model, and the analyzer may be configured to recognize a specific object in the image being played through the first screen using the synchronized content object recognition model, in response to presence of a recognized object, to forward content and related information associated with the recognized object to the related content storage and the transmitter and, in response to absence of the recognized object, to repeat an object recognition process using the content object recognition model.

The model executor may be configured to switch from a content object recognition mode to a camera-based image recognition mode, to suspend synchronization between a content object recognition model and the analyzer, and to synchronize a camera-based image recognition model with the analyzer to provide the heterogeneous image recognition service in the single image recognition service operating environment when playing the related content through the second screen.

The camera processing may be configured to acquire an image of users viewing the related content being played through the second screen, to perform preprocessing for camera-based image recognition on the image acquired through the camera, and to transmit the preprocessed image to the analyzer that is synchronized with the camera-based image recognition model, and image acquiring through the camera may be repeated until the related content being played through the second screen is terminated.

The analyzer may be configured to recognize the users from the image of the users viewing the related content acquired through the camera, using the camera-based image recognition model and to analyze and record information associated with the recognized users.

The controller may be configured to control the model executor to maintain the camera-based image recognition mode and to control the analyzer to transmit related content and related information according to results analyzed by recognizing the corresponding user, and may control the model executor to switch from the camera-based image recognition mode to the content object recognition mode and to repeat a content object recognition process in response to completion of the camera-based image recognition mode.

According to another aspect, there is provided a method of providing a section divided heterogeneous image recognition service in a single image recognition service operating system, the method including receiving, using a remote image transceiver, and preprocessing an image received through a path other than a camera and transmitting the preprocessed image to an analyzer and a first screen; synchronizing, using a model executor, a first image recognition model with the analyzer to provide a heterogeneous image recognition service in a single image recognition service operating environment when playing content through the first screen; extracting, using the analyzer, and identifying a target from an image acquired according to the first image recognition model that is synchronized with the model executor and forwarding related content-related information to a related content storage and a transmitter based on extraction and identification results; transmitting, using the transmitter to a second screen, related content and related information stored in the related content storage based on the related content-related information forwarded from the analyzer; suspending, using the model executer, synchronization between the first image recognition model and the analyzer and synchronizing a second image recognition model with the analyzer to provide the heterogeneous image recognition service in the single image recognition service operating environment when playing related content through the second screen; preprocessing, using a camera processing, an image acquired through the camera and transmitting the preprocessed image to the analyzer to be analyzed; and controlling, using a controller, the model executor, the analyzer, the camera processing, and the remote image transceiver based on service requirements input from a user.

According to some example embodiments, a method and apparatus for providing a section divided heterogeneous image recognition service in a single image recognition service operating environment may switch and simultaneously provide heterogeneous image recognition types through service recognition in a single image recognition service operating environment in which only a single image recognition service is provided at a time, and may simultaneously provide heterogeneous image recognition service types to a user by alternately switching between heterogeneous image recognition types according to characteristic, purpose, and time information of heterogeneous image recognition service types.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a flowchart illustrating a method of providing a section divided heterogeneous image recognition service in a single image recognition service operating environment according to an example embodiment.

DETAILED DESCRIPTION

Figure 1:
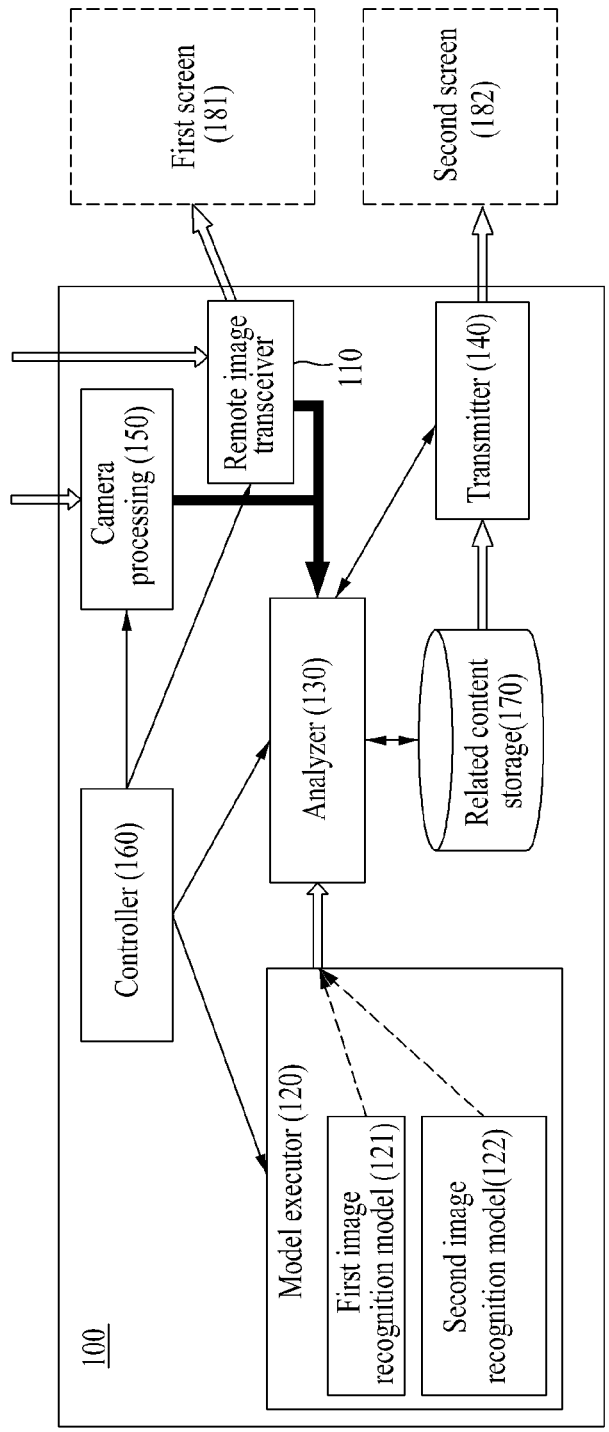
FIG. 1 illustrates a configuration of an apparatus for providing a section divided heterogeneous image recognition service in a single image recognition service operating environment according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A method and apparatus for providing a section divided heterogeneous image recognition service in a single image recognition service operating environment proposed herein may simultaneously provide a heterogeneous image recognition service to a service user by alternately switching between both image recognition services according to characteristics, purpose, and time information of the heterogenous image recognition service.

FIG. 1 illustrates a configuration of an apparatus for providing a section divided heterogeneous image recognition service in a single image recognition service operating environment according to an example embodiment.

Referring to FIG. 1, an apparatus 100 for providing a section divided heterogeneous image recognition service in a single image recognition service operating environment includes a remote image transceiver 110, a model executor 120, an analyzer 130, a transmitter 140, a camera processing 150, a controller 160, and a related content storage 170.

The remote image transceiver 110 receives and processes an image received through a path other than a camera, and transmits the processed image to the analyzer 130 and a first screen 181. For example, the remote image transceiver 110 may receive, from a server, main content to be displayed for a user, the analyzer 130 may perform object recognition of the main content, and the first screen 181 may display the main content for the user.

The model executor 120 switches a single model of a first image recognition model 121 and a second image recognition model 122 and synchronizes the switched model with the analyzer 130 to provide a heterogeneous image recognition service in a single image recognition service operating environment. The model executor 120 according to an example embodiment may synchronize the first image recognition model 121 with the analyzer 130 when playing content through the first screen 181. Also, when playing related content through a second screen 182, the model executor 120 may suspend synchronization between the first image recognition model 121 and the analyzer 130 and may synchronize the second image recognition model 122 and the analyzer 130.

According to an example embodiment, to provide the heterogeneous image recognition service in the single image recognition service operating environment when playing the content through the first screen 181, the model executor 120 may synchronize the first image recognition model 121, for example, a content object recognition model with the analyzer 130 such that the analyzer 130 may extract and identify a target from an image being played using the synchronized content object recognition model. Here, the model executor 120 switches to a content object recognition mode during the heterogeneous image recognition service and synchronizes the content object recognition model with the analyzer 130.

The analyzer 130 extracts and identifies a target from an image acquired according to a model that is synchronized with the model executor 120, and forwards related content-related information to the related content storage 170 and the transmitter 140 based on extraction and identification results. That is, the analyzer 130 may recognize a specific object in the image being played through the first screen 181, and, in response to presence of a recognized object, may forward content and related information associated with the corresponding object. In response to absence of the recognized object, the analyzer 130 may repeat an object recognition process using the content object recognition model.

Here, the transmitter 140 transmits, to the second screen 182, related content and related information stored in the related content storage 170 based on the related content-related information forwarded from the analyzer 130. The second screen 182 displays the received related content for the user.

For example, if an image including a vehicle is being played on the first screen 181, the analyzer 130 synchronized with the content object recognition model may extract and identify the vehicle and an emblem from the image and may forward information associated with a brand of the vehicle to the related content storage 170 and the transmitter 140. If a promotional image of the brand of the vehicle is stored in the related content storage 170, the transmitter 140 may forward the promotional image of the brand of the vehicle to the second screen 182 to be displayed for the user.

When playing the related content through the second screen 182, synchronization between the first image recognition model 121 and the analyzer 130 is suspended by the model executor 120 and the second image recognition model 122 is synchronized with the analyzer 130.

According to an example embodiment, to provide the heterogeneous image recognition service when playing the related content through the second screen 182, the model executor 120 may suspend synchronization between the first image recognition model 121, for example, the content object recognition model and the analyzer 130 and may synchronize the second image recognition model 122, for example, a camera-based image recognition model with the analyzer 130. That is, the model executor 120 switches to a camera-based image recognition mode during the heterogeneous image recognition service and synchronizes the camera-based image recognition model with the analyzer 130.

If the related content is played through the second screen 182, the camera processing 150 processes the image acquired through the camera and transmits the processed image to the analyzer 130. For example, the camera processing 150 may acquire an image of users viewing the related content being played through the second screen 182, may perform preprocessing for camera-based image recognition on the image acquired through the camera, and may transmit the preprocessed image to the analyzer 130 that is synchronized with the camera-based image recognition model. Such image acquiring through the camera may be repeated until the related content being played through the second screen 182 is terminated.

For example, if the promotional image of the vehicle recognized from the first screen 181 is played through the second screen 182, the camera processing 150 may acquire an image of users viewing the corresponding promotional image through the camera. Once the image of users is acquired, the analyzer 130 synchronized with the camera-based image recognition model may recognize the users from the acquired image and may analyze and record information associated with the users.

The controller 160 may control the model executor 120, the analyzer 130, the camera processing 150, and the remote image transceiver 110 based on service requirements input from the user.

The related content storage 170 stores related content and related information to be transmitted based on analysis results of the analyzer 130 and forwards the related content and the related information to the transmitter 140 in response to an external request.

In response to completion of the camera-based image recognition mode, the model executor 120 switches again from the camera-based image recognition mode to the content object recognition mode and repeats a content object recognition process.

Figure 2:
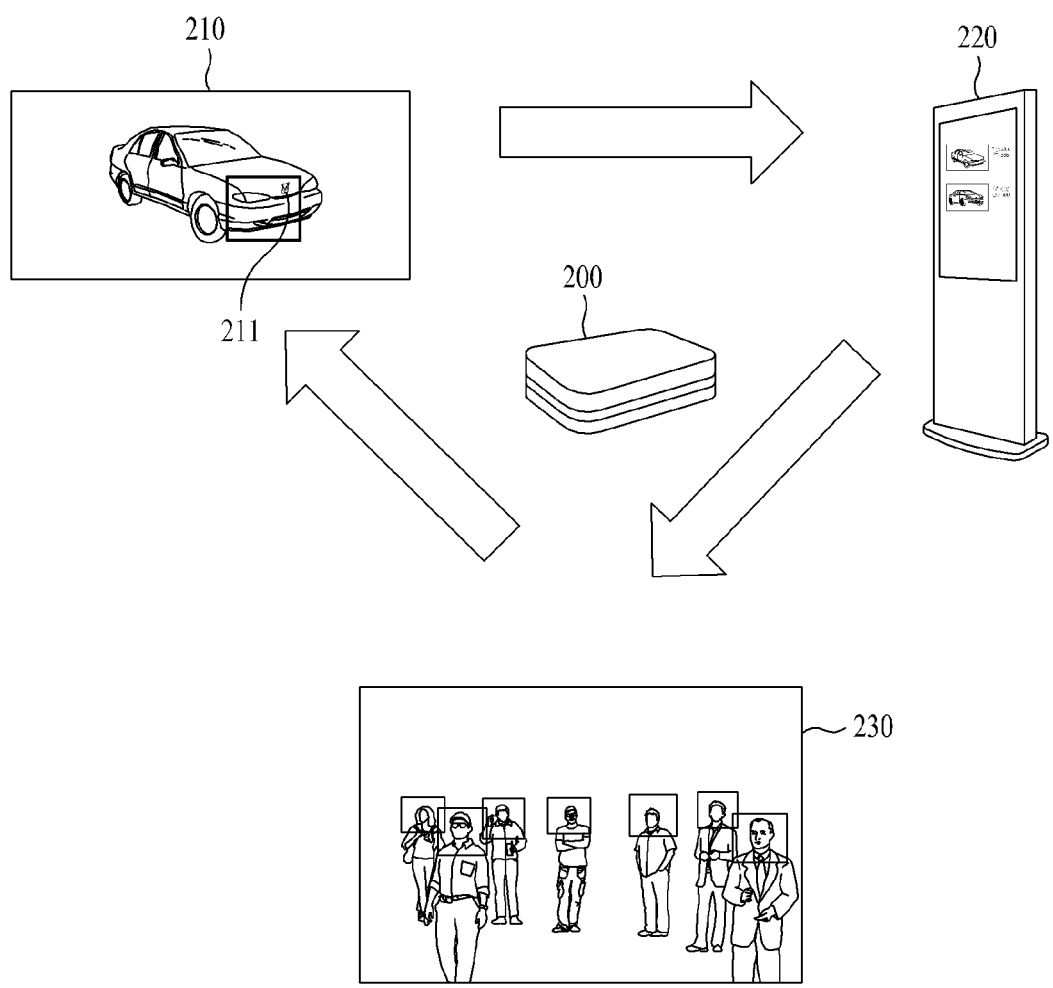
FIG. 2 illustrates an example of describing a process of providing a heterogeneous image recognition service according to an example embodiment.

FIG. 2 illustrates an example of describing a process of providing a heterogeneous image recognition service according to an example embodiment.

An apparatus 200 for providing a section divided heterogeneous image recognition service in a single image recognition service operating environment according to an example embodiment may receive, from a server, main content to be displayed for a user through a remote image transceiver, may perform object recognition of the main content through an analyzer, and may display the main content for the user through a first screen 210.

To provide the heterogeneous image recognition service in the single image recognition service operating environment when playing the content through the first screen 210, the model executor may synchronize a first image recognition model, for example, a content object recognition model with the analyzer such that the analyzer may extract and identify a target from an image being played using the synchronized content object recognition model. Here, the model executor switches to a content object recognition mode during the heterogeneous image recognition service and synchronizes the content object recognition model with the analyzer.

The analyzer extracts and identifies a target from an image acquired according to a model that is synchronized with the model executor, and forwards related content-related information to a related content storage and a transmitter based on extraction and identification results. That is, the analyzer may recognize a specific object, for example, a vehicle or an emblem 211 of the vehicle, in the image being played through the first screen 210, and, in response to presence of a recognized object, may forward content and related information associated with the corresponding object. In response to absence of the recognized object, the analyzer may repeat an object recognition process using the content object recognition model.

Here, the transmitter transmits, to a second screen 220, related content and related information stored in the related content storage based on the related content-related information forwarded from the analyzer. The second screen 220 displays the received related content for the user.

For example, if the image including the vehicle is being played on the first screen 210, the analyzer synchronized with the content object recognition model may extract and identify the vehicle and the emblem 211 of the vehicle from the image and may forward information associated with a brand of the vehicle to the related content storage and the transmitter. If a promotional image of the brand of the vehicle is stored in the related content storage, the transmitter may forward the promotional image of the brand of the vehicle to the second screen 220 to be displayed for the user.

When playing the related content through the second screen 220, synchronization between the first image recognition model and the analyzer is suspended by the model executor and a second image recognition model is synchronized with the analyzer.

According to an example embodiment, to provide the heterogeneous image recognition service when playing the related content through the second screen 220, the model executor may suspend synchronization between the content object recognition model and the analyzer and may synchronize a camera-based image recognition model with the analyzer. That is, the model executor switches to a camera-based image recognition mode during the heterogeneous image recognition service and synchronizes the camera-based image recognition model with the analyzer.

If the related content is played through the second screen 220, the camera processing processes the image acquired through the camera and transmits the processed image to the analyzer. For example, the camera processing may acquire an image 230 of users viewing the related content being played through the second screen 220, may perform preprocessing for camera-based image recognition on the image 230 acquired through the camera, and may transmit the preprocessed image 230 to the analyzer that is synchronized with the camera-based image recognition model. Such image acquiring through the camera may be repeated until the related content being played through the second screen 220 is terminated.

For example, if the promotional image of the vehicle recognized from the first screen 210 is played through the second screen 220, the camera processing may acquire the image 230 of users viewing the corresponding promotional image through the camera. Once the image 230 of users is acquired, the analyzer synchronized with the camera-based image recognition model may recognize the users from the acquired image 230 and may analyze and record information associated with the users.

FIG. 3 is a flowchart illustrating a method of providing a section divided heterogeneous image recognition service in a single image recognition service operating environment according to an example embodiment.

The method of providing the section divided heterogeneous image recognition service in the single image recognition service operating environment proposed herein may include operation 310 of receiving, using a remote image transceiver, and preprocessing an image received through a path other than a camera and transmitting the preprocessed image to an analyzer and a first screen; operation 320 of synchronizing, using a model executor, a first image recognition model with the analyzer to provide a heterogeneous image recognition service in a single image recognition service operating environment when playing content through the first screen; operation 330 of extracting, using the analyzer, and identifying a target from an image acquired according to the first image recognition model that is synchronized with the model executor and forwarding related content-related information to a related content storage and a transmitter based on extraction and identification results; operation 340 of transmitting, using the transmitter to a second screen, related content and related information stored in the related content storage based on the related content-related information forwarded from the analyzer; operation 350 of suspending, using the model executor, synchronization between the first image recognition model and the analyzer and synchronizing a second image recognition model with the analyzer to provide the heterogeneous image recognition service in the single image recognition service operating environment when playing related content through the second screen; operation 360 of preprocessing, using a camera processing, an image acquired through the camera and transmitting the preprocessed image to the analyzer to be analyzed; and operation (not shown) of controlling, using a controller, the model executor, the analyzer, the camera processing, and the remote image transceiver based on service requirements input from a user.

In operation 5310, the remote image transceiver receives and preprocesses the image received through the path other than the camera and transmits the preprocessed image to the analyzer and the first screen. For example, main content to be displayed for the user may be received from a server, the analyzer may perform object recognition of the main content, and the first screen may display the main content for the user.

In operation 320, to provide the heterogeneous image recognition service in the single image recognition service operating environment when playing content through the first screen, the model executor synchronizes the first image recognition model with the analyzer.

According to an example embodiment, to provide the heterogeneous image recognition service in the single image recognition service operating environment when playing the content through the first screen, the model executor may synchronize a content object recognition model, that is, the first image recognition model with the analyzer such that the analyzer may extract and identify a target from an image being played using the synchronized content object recognition model. Here, the model executor switches to a content object recognition mode during the heterogeneous image recognition service and synchronizes the content object recognition model with the analyzer.

In operation 330, the analyzer extracts and identifies the target from the image acquired according to the model that synchronized with the model executor, and forwards the related content-related information to the related content storage and the transmitter based on the extraction and identification results. That is, the analyzer may recognize a specific object in the image being played through the first screen, and, in response to presence of a recognized object, may forward content and related information associated with the corresponding object. In response to absence of the recognized object, the analyzer may repeat an object recognition process using the content object recognition model.

In operation 340, the transmitter transmits, to the second screen, the related content and the related information stored in the related content storage based on the related content-related information forwarded from the analyzer.

The second screen displays the received related content for the user.

For example, if an image including a vehicle is being played on the first screen, the analyzer synchronized with the content object recognition model may extract and identify the vehicle and an emblem from the image and may forward information associated with a brand of the vehicle to the related content storage and the transmitter. If a promotional image of the brand of the vehicle is stored in the related content storage, the transmitter may forward the promotional image of the brand of the vehicle to the second screen to be displayed for the user.

In operation 350, to provide the heterogeneous image recognition service in the single image recognition service operating environment when playing the related content through the second screen, the model executor suspends synchronization between the first image recognition model and the analyzer and synchronizes the second image recognition model with the analyzer.

According to an example embodiment, to provide the heterogeneous image recognition service when playing the related content through the second screen, the model executor may suspend synchronization between the content object recognition model, that is the first image recognition model and the analyzer and may synchronize a camera-based image recognition model, that is, the second image recognition model with the analyzer. That is, the model executor switches to a camera-based image recognition mode during the heterogeneous image recognition service and synchronizes the camera-based image recognition model with the analyzer.

In operation 360, the camera processing preprocesses the image acquired through the camera and transmits the preprocessed image to the analyzer to be analyzed. For example, the camera processing may acquire an image of users viewing the related content being played through the second screen, may perform preprocessing for camera-based image recognition on the image acquired through the camera, and may transmit the preprocessed image to the analyzer that is synchronized with the camera-based image recognition model. Such image acquiring through the camera may be repeated until the related content being played through the second screen is terminated.

For example, if the promotional image of the vehicle recognized from the first screen is played through the second screen, the camera processing may acquire an image of users viewing the corresponding promotional image through the camera. Once the image of users is acquired, the analyzer synchronized with the camera-based image recognition model may recognize the users from the acquired image and may analyze and record information associated with the users.

The related content storage stores related content and related information to be transmitted based on analysis results of the analyzer and forwards the related content and the related information to the transmitter in response to an external request.

In response to completion of the camera-based image recognition mode, the model executor switches again from the camera-based image recognition mode to the content object recognition mode and repeats a content object recognition process.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for providing a heterogeneous image recognition service, the apparatus comprising:
a remote image transceiver configured to receive and preprocess an image received through a path other than a camera and to transmit the preprocessed image to an analyzer and a first screen;
a model executor configured to switch a single model of a first image recognition model and a second image recognition model and to synchronize the switched model with the analyzer to provide a heterogeneous image recognition service in a single image recognition service operating environment, the model executor configured to synchronize the first image recognition model with the analyzer when playing content through the first screen and to suspend synchronization between the first image recognition model and the analyzer and to synchronize the second image recognition model with the analyzer when playing related content through a second screen;
the analyzer configured to extract and identify a target from an image acquired according to a model that is synchronized with the model executor and to forward related content-related information to a related content storage and a transmitter based on extraction and identification results;
the transmitter configured to transmit, to the second screen, related content and related information stored in the related content storage based on the related content-related information forwarded from the analyzer;
a camera processing configured to preprocess an image acquired through the camera and to transmit the preprocessed image to the analyzer;
a controller configured to control the model executor, the analyzer, the camera processing, and the remote image transceiver based on service requirements input from a user; and
the related content storage configured to store related content and related information to be transmitted based on analysis results of the analyzer and to forward the related content and the related information to the transmitter in response to an external request.

2. The apparatus of claim 1, wherein the model executor is configured to switch to a content object recognition mode and to synchronize a content object recognition model with the analyzer to provide the heterogeneous image recognition service in the single image recognition service operating environment when playing the content through the first screen, such that the analyzer extracts and identifies a target from an image being played using the synchronized content object recognition model, and
the analyzer is configured to recognize a specific object in the image being played through the first screen using the synchronized content object recognition model, in response to presence of a recognized object, to forward content and related information associated with the recognized object to the related content storage and the transmitter and, in response to absence of the recognized object, to repeat an object recognition process using the content object recognition model.

3. The apparatus of claim 1, wherein the model executor is configured to switch from a content object recognition mode to a camera-based image recognition mode, to suspend synchronization between a content object recognition model and the analyzer, and to synchronize a camera-based image recognition model with the analyzer to provide the heterogeneous image recognition service in the single image recognition service operating environment when playing the related content through the second screen, and
the camera processing is configured to acquire an image of users viewing the related content being played through the second screen, to perform preprocessing for camera-based image recognition on the image acquired through the camera, and to transmit the preprocessed image to the analyzer that is synchronized with the camera-based image recognition model, and image acquiring through the camera is repeated until the related content being played through the second screen is terminated.

4. The apparatus of claim 3, wherein the analyzer is configured to recognize the users from the image of the users viewing the related content acquired through the camera, using the camera-based image recognition model and to analyze information associated with the recognized users, and
the controller is configured to control the model executor to switch or maintain the camera-based image recognition mode and to control the analyzer to recognize and analyze the corresponding user in response to the input of the service requirements from the user, and to control the model executor to switch from the camera-based image recognition mode to the content object recognition mode and to repeat a content object recognition process in response to completion of the camera-based image recognition mode.

5. A method of providing a heterogeneous image recognition service, the method comprising:

receiving, using a remote image transceiver, and preprocessing an image received through a path other than a camera and transmitting the preprocessed image to an analyzer and a first screen;

synchronizing, using a model executor, a first image recognition model with the analyzer to provide a heterogeneous image recognition service in a single image recognition service operating environment when playing content through the first screen;

extracting, using the analyzer, and identifying a target from an image acquired according to the first image recognition model that is synchronized with the model executor and forwarding related content-related information to a related content storage and a transmitter based on extraction and identification results;

transmitting, using the transmitter to a second screen, related content and related information stored in the related content storage based on the related content-related information forwarded from the analyzer;

suspending, using the model executer, synchronization between the first image recognition model and the analyzer and synchronizing a second image recognition model with the analyzer to provide the heterogeneous image recognition service in the single image recognition service operating environment when playing related content through the second screen;

preprocessing, using a camera processing, an image acquired through the camera and transmitting the preprocessed image to the analyzer to be analyzed; and controlling, using a controller, the model executor, the analyzer, the camera processing, and the remote image transceiver based on service requirements input from a user.

6. The method of claim 5, wherein the synchronizing, using the model executor, the first image recognition model with the analyzer to provide the heterogeneous image recognition service in the single image recognition service operating environment when playing the content through the first screen comprises:

switching to a content object recognition mode and synchronizing a content object recognition model with the analyzer such that the analyzer extracts and identifies an object from an image being played through the first screen, and recognizes a specific object using the synchronized content object recognition model; and in response to presence of a recognized object, forwarding content and related information associated with the corresponding object to the related content storage and the transmitter and, in response to absence of the recognized object, repeating an object recognition process using the content object recognition model.

7. The method of claim 5, wherein the preprocessing, using the camera processing, the image acquired through the camera and transmitting the preprocessed image to the analyzer to be analyzed comprises:

switching from a content object recognition mode to a camera-based image recognition mode, acquiring an image of users viewing related content being played through the second screen, repeating image acquiring through the camera until the related content being played through the second screen is terminated, performing preprocessing for camera-based image recognition through the camera processing on the acquired image, and transmitting the preprocessed image to the analyzer that is synchronized with a camera-based image recognition model; and recognizing, using the analyzer, users from an image of the users viewing the related content acquired through the camera, and analyzing related information of the recognized users, and the controlling, using the controller, the model executor, the analyzer, the camera processing, and the remote image transceiver based on service requirements input from a user comprises controlling, using the controller, the model executor to switch or maintain the camera-based image recognition mode and controlling the analyzer to recognize and analyze the corresponding user, in response to input of service requirements from the user and controlling the model executor to switch from the camera-based image recognition mode to the content object recognition mode and to repeat a content object recognition process in response to completion of the camera-based image recognition mode.

* * * * *